United States Patent [19]

Seo et al.

[11] Patent Number: 5,406,535
[45] Date of Patent: Apr. 11, 1995

[54] HEAD SEEKING CONTROL APPARATUS WITH CHANGEABLE SPEED REFERENCES

[75] Inventors: Naobumi Seo; Hidetoshi Ikeda; Takaharu Yoshida, all of Yokohama, Japan

[73] Assignee: Kabushiki Kaisha Toshiba, Kawasaki, Japan

[21] Appl. No.: 31,863

[22] Filed: Mar. 16, 1993

[30] Foreign Application Priority Data

Mar. 26, 1992 [JP] Japan .................... 4-068275

[51] Int. Cl.⁶ .............................. G11B 7/00
[52] U.S. Cl. .................... 369/44.28; 369/44.25; 360/78.06; 360/78.07
[58] Field of Search ............... 369/44.28, 44.32, 44.25, 369/44.27; 360/78.06, 78.07, 78.04, 78.08, 78.14, 77.04, 77.06

[56] References Cited

U.S. PATENT DOCUMENTS

| | | | |
|---|---|---|---|
| 4,591,933 | 5/1986 | Quakenbush | 360/78.06 |
| 4,622,604 | 11/1986 | Hashimoto et al. | 360/78.07 |
| 4,858,214 | 8/1989 | Baba . | |
| 4,899,234 | 2/1990 | Genheimer | 360/78.07 |
| 4,914,725 | 4/1990 | Belser et al. | 360/77.06 |
| 4,931,889 | 6/1990 | Osafune | 360/78.07 |
| 4,937,689 | 6/1990 | Seaver et al. | 360/78.06 |
| 4,965,501 | 10/1990 | Hashimoto | 360/78.07 |
| 4,982,298 | 1/1991 | Volz et al. | 360/78.06 |
| 5,063,549 | 11/1991 | Yamamuro | 369/44.28 |
| 5,090,001 | 2/1992 | Ito et al. . | |
| 5,157,645 | 10/1992 | Takahara et al. . | |
| 5,220,547 | 6/1993 | Yasukawa et al. . | |
| 5,249,168 | 9/1993 | Kagami et al. . | |

*Primary Examiner*—Aristotelis Psitos
*Assistant Examiner*—P. W. Huber
*Attorney, Agent, or Firm*—Cushman, Darby & Cushman

[57] ABSTRACT

A head control apparatus of the invention includes a moving unit for moving an optical head to a given information track on an optical disk having concentric information tracks, a detector for detecting a direction of movement of the optical head from the a signal reproduced from the optical head, and a controller that, when the detector has detected the direction of movement of the optical head, controls the moving unit so that the optical head may move to a specified information track at a first speed, and that, when the detector has not detected the direction of movement the optical head, controls the moving unit so that the optical head may move to a specified information track at a second speed slower than the first speed.

15 Claims, 7 Drawing Sheets

HEAD SEEKING CONTROL APPARATUS WITH CHANGEABLE SPEED REFERENCES

BACKGROUND OF THE INVENTION

1. Field of the Invention

This invention relates to a head control apparatus enabling the head to seek tracks stably at high speed in record/reproduce apparatuses with a replaceable rotating recording medium, such as CD-ROM readers, optical disk apparatuses, large-capacity floppy-disk apparatuses, or removable hard disk apparatuses.

2. Description of the Related Art

Record/reproduce apparatuses (or reproduce apparatuses) using a replaceable rotating recording medium include magnetooptic disk apparatuses (or CD-ROM apparatuses). Magnetooptic disks (or CD-ROM disks) used in those disk apparatuses have concentric or spiral information tracks. In the disk apparatuses, magnetic characteristic-changed regions, metal state-changed regions, or physical irregularities (pits) are formed on the information tracks or between adjacent information tracks, and the information is written (recorded) into or read (reproduced) from those regions.

For example, in magnetooptic disk apparatuses that record and reproduce the information along the tracks, the optical head is controlled so that the light spot may be centered directly on the track. When the information is written into or read from the target track away from the current optical head position, the head tries to access the target track. The action of accessing the track is called the seeking operation.

In the seeking operation, by moving the head carriage assembly supporting the optical head in the direction of the radius of the optical disk under speed control, the light spot from the optical head moves swiftly to the target track, traversing some of the concentric tracks.

Such speed control requires sensing of the head moving speed. The head moving speed can be sensed by digitizing the readout signal from the optical head (for example, the push-pull combined signal from the output of two photo diodes) on the basis of a specific level, then counting the interval between the digitized signals in response to a specified clock, and finally computing the reciprocal of the count result, which represents the head moving speed.

To enable the light spot to cross concentric tracks and move to the target track quickly and reliably, it is necessary to sense the head moving direction (the head's motion from the internal to the external circumference or vice versa) in the speed control. The reason for this will be explained below.

It is assumed that the light spot moves from the external to the internal circumference of the rotating disk. When a disk is off-centered, the concentric tracks on the disk move back and forth in the direction of the disk's radius at a frequency proportional to the rotating speed of the disk. When the speed at which the tracks move toward the internal circumference of the disk exceeds the moving speed of the light spot, the relative speed between the light spot and the tracks with respect to the disk's radial direction is temporarily inverted in sign.

Specifically, despite the fact that the light spot is moving toward the internal circumference of the disk, there arises the situation in some portions where the light spot moves toward the external circumference of the disk. That is, the direction of movement the light spot varies with respect to the disk, due to the disk's eccentricity.

Therefore, in an optical disk apparatus using a replaceable rotating recording medium that is inevitably off-centered to some extent, the ability to sense the direction in which the light spot is moving is necessary for performing quick and reliable speed control.

The direction of the light spot movement can be detected from the phase difference between the digitized difference signal (the push-pull combined signal) of the opposite phase output from a plurality of optical sensors constituting the optical head and the digitized sum signal of the in-phase outputs.

Figure 5:
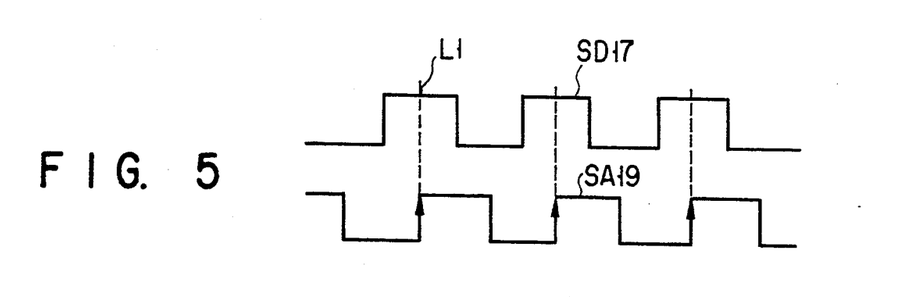
FIG. 5 is a chart for explaining a case where the sum signal from the FIG. 1 optical head leads the difference signal by a phase angle of 90° and the + moving direction of the optical head (for example, from the internal to the external circumference of the disk) is sensed.

Specifically, as shown in FIG. 5, by sampling and holding the signal level L1 of digitized difference signal SD17 at the rising edge of digitized sum signal SA19, it can be sensed with L1=high level that the light spot moves from the external to the internal circumference.

Figure 6:
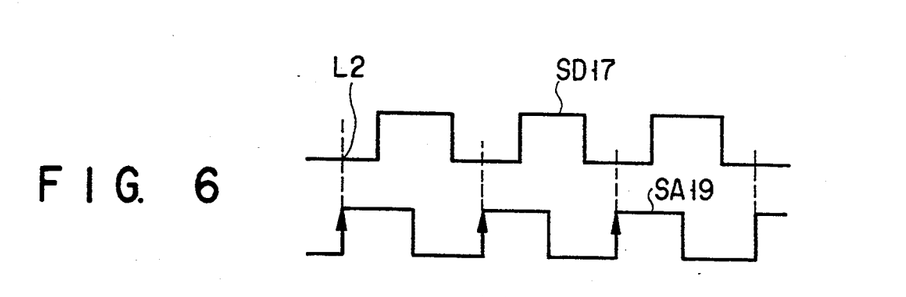
FIG. 6 is a chart for explaining a case where the sum signal from the FIG. 1 optical head lags the difference signal by a phase angle of 90° and the − moving direction of the optical head (for example, from the external to the internal circumference of the disk) is sensed.

As shown in FIG. 6, by sampling and holding the signal level L2 of digitized difference signal SD17 at the rising edge of digitized sum signal SA19, it can be sensed with L2=low level that the light spot moves from the internal to the external circumference.

when the phase difference becomes almost 0° (the in-phase) or 180° (the opposite phase) for some reason, however, the moving direction cannot be sensed.

Figure 7:
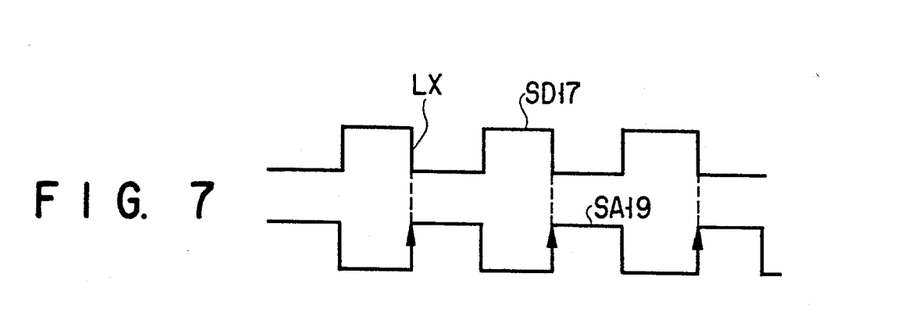
FIG. 7 is a chart for explaining a case where the phase difference between the sum signal and the difference signal from the FIG. 1 optical head becomes 180° and the moving direction of the optical head cannot be sensed.

Specifically, as shown in FIG. 7, when the rising edge of digitized sum signal AS19 has overlapped with the signal edge of digitized difference signal SD17, even after the signal edge level LX of digitized difference signal SD17 has been sample-held, it is not determined whether LX is at high level or low level, so that it is impossible to sense the direction in which the light spot is moving.

The sum signal has a relatively small amplitude as compared with the difference signal whose amplitude is easily made larger by performing the push-pull operation. When the readout signal level of the sum signal is so low that the digitized output of the sum signal cannot be obtained, it is impossible to sense the moving direction.

Figure 8:
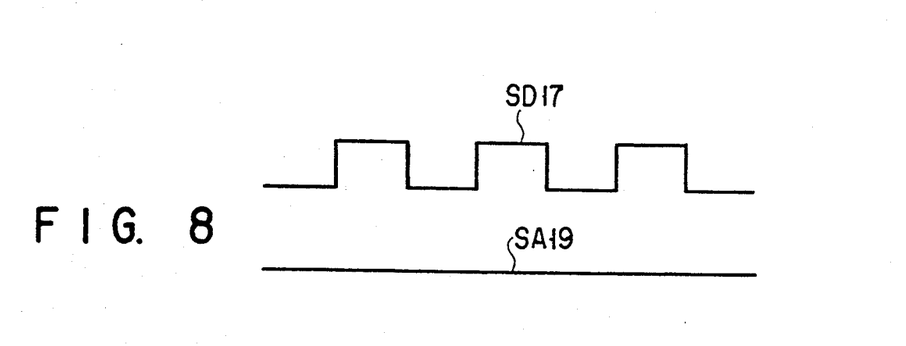
FIG. 8 is a chart for explaining a case where the level of the sum signal from the FIG. 1 optical head is so low that its digitized output cannot be produced and only the difference signal is generated, so that the movement direction of the optical head cannot be sensed.

Specifically, as shown in FIG. 8, when no digitized sum signal SA19 is produced and the digitized difference signal SD17 cannot be sampled and held, it is impossible to sense the direction in which the light spot is moving.

when the speed control is carried out in the situation where it is impossible to sense the direction in which the light spot is moving, not only will high-speed, accurate access to the target be impossible, but also a running away of the control system will make the seeking operation unstable.

Since the movement of the tracks due to the eccentric rotation of the disk takes the form of a sinusoidal wave, when the average is taken over a period of time longer than the period of the sinusoidal wave, relative changes in the seeking direction due to the movement of the tracks are canceled, thus making it possible to perform speed control provided that the seeking direction is not inverted. To achieve this, the seeking speed must be sufficiently slow as compared with the speed at which the tracks move back and forth in the radial direction of the disk.

If the operating parameters of the control system are set so that the seeking operation is very slow, due to the fear that the control system may become unstable, the high speed track seeking ability of the head will be sacrificed.

SUMMARY OF THE INVENTION

The object of the present invention is to reconcile the high speed with the stability of the head seeking tracks in record/reproduce apparatuses (or reproduce-only apparatuses) using a replaceable rotating recording medium that is inevitably off-centered to some extent.

The foregoing object is accomplished by providing a head movement control apparatus comprising: means for moving the head to a given information track on a disk with concentric information tracks; means for detecting the head movement from the reproduced signal from the head; and means for controlling the moving means so that the head may move to a specified information track at a specified speed.

The controlling means, if the detecting means has detected the moving situation of the head correctly, controls the moving means so that the head may move to a specified track at a first speed, and if not, controls the moving means so that the head may move to a specified track at a second speed slower than the first speed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Figure 1:
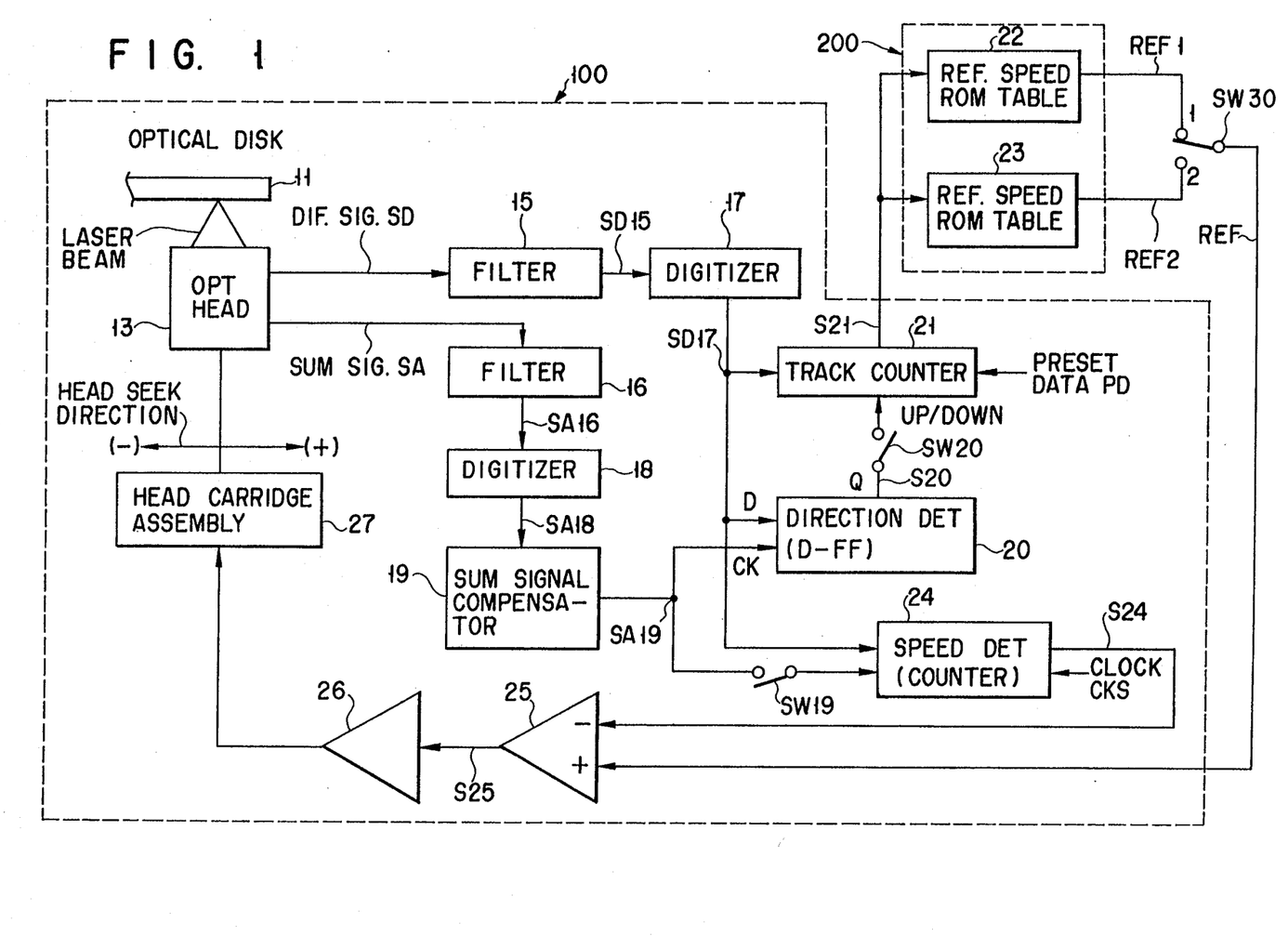
FIG. 1 is a block diagram of a head control apparatus according to an embodiment of the present invention.

FIG. 1 is a block diagram of a head control apparatus according to an embodiment of the present invention.

In FIG. 1, numeral 11 indicates a 3.5-inch magnetooptic (MO) disk, for example. The disk 11 is rotated at a constant angular velocity (or a constant linear velocity) by a spindle motor (not shown) subjected to speed control.

The disk 11 has concentric information tracks (grooves) called a group on it, for example. A plurality of sector marks (header information) are previously recorded in the information tracks at regular intervals. The sector marks, which are formed of a physical combination of more than one hole (pit), represent the addresses (the track number, the sector number, and others) of the information recording areas that follow.

The optical head (laser pick-up) 13 is designed to project the laser beam onto the disk 11. This beam projection causes the light spot to move on the disk 11. The light spot is used to write (record) the information in a specific track on the disk 11, or to read (reproduce) the information from the track.

The optical head 13, which is driven by the actuator (not shown) of a head carriage assembly 27, moves freely in the direction of arrow in FIG. 1 (in the direction of the radius of the disk 11, or the direction in which it moves across the tracks on the disk) during seeking. That is, the actuator moves the optical head 13 in the direction of the radius of the disk 11, which causes the light spot from the optical head 13 to access (seek) the target track.

The optical head 13, which is provided with a plurality of photodiodes (not shown) arranged in parallel in the direction of crossing the information tracks on the disk 11, senses the laser beam reflected light (or transmitted light) with those photodiodes (optical sensor means). The head 13, from the sense signal from each photo diode, produces the difference signal (the push-pull combined signal of two sense signals whose phases are opposite to each other) SD and the sum signal (the add combined signal of two sense signals whose phases are in phase with one another) SA.

The seeking of tracks or the accessing of the target track is done by a feedback loop control system made up of the circuit components 15 to 27 in FIG. 1, based on the difference signal SD and the sum signal SA.

Specifically, the difference signal SD and sum signal SA from the optical head 13 are passed through a filter 15 and a filter 16, respectively, to remove high-frequency noises from these signals SD and SA. After the filtering, the difference signal SD15 and sum signal SA16 are digitized at digitizers 17 and 18, respectively. The digitization is carried out with, for example, the intermediate level between the maximum and the minimum of the input signal level used as a threshold value.

The digitized difference signal SD17 from the digitizer 17 is supplied to a direction detector 20, a track counter 21, and a speed detector 24. The digitized sum signal SA18 from the digitizer 18 is supplied to a sum signal compensator 19.

The sum signal compensator 19 averages the digitized sum signal SA18 during a certain period of time, and then shapes the resulting signal to remove the remaining noise and correct the sum signal into a square wave with a duty ratio of 50%.

The digitized sum signal SA19 corrected at the sum signal compensator 19 is supplied to the direction detector 20, which operates as described below, in order to detect the seeking direction of the optical head 13.

Specifically, when the light spot moves from the external toward the internal circumference (the − direction movement), the direction detector 20 sample-holds the signal level L1 of the digitized difference signal SD17 at the rising edge of the digitized sum signal SA19 to produce a signal S20 of a high level L1, as shown in FIG. 5.

When the light spot moves from the internal toward the internal circumference (the + direction movement), the direction detector 20 sample-holds the signal level L2 of the digitized difference signal SD17 at the rising edge of the digitized sum signal SA19 to produce a signal S20 of a low level L2, as shown in FIG. 6.

In this way, the signal S20 whose logical level varies depending on the moving direction (the seeking direction) of the light spot is supplied via a switch SW20 to the count-up/countdown specifying input terminal of the track counter 21.

The direction detector 20 may be composed of a D flip-flop that uses signal SD17 as the D terminal input and is clocked by signal SA19. Signal S20 can be obtained from the Q output terminal of the D flip-flop.

Data PD indicating the number of tracks for the light spot to cross before it reaches the target track from where it is now, is preset in the track counter 21 before the seeking operation is started. Here, the control CPU (the CPU 500 of FIG. 11), which knows where the target track is, loads the preset data PD into the counter 21 immediately before it issues an instruction to start seeking.

The digitizer 17 produces a single pulse of digitized difference signal SD17 each time the optical head 13 has moved so as to cause the light spot to traverse one track on the disk 11. This difference signal SD17 is supplied as clock pulse CK to the track counter 21.

In the seeking operation performed in the − direction of FIG. 1, when signal S20 specifies countdown (S20=L1), the track counter 21 counts down the pulse CK, starting at the + count data preset by data PD. The value of the count output S21 of the counter 21 then decreases as the light spot approaches the target track. When it has reached the target track, the count becomes zero.

During the seeking operation, when the level of signal S20 is inverted temporarily due to the eccentricity of the disk 11 (S20=L2), the counter 21 counts up the pulse CK during only that period to correct the count output S21.

Conversely, in the seeking operation performed in the + direction of FIG. 1, when signal S20 specifies count-up (S20=L2), the track counter 21 counts up the pulse CK, starting at the − count data preset by data PD. The value of the count output S21 of the counter 21 then increases as the light spot approaches the target track. When it has reached the target track, the count becomes zero.

During the seeking operation, when the level of signal S20 is inverted temporarily due to the eccentricity of the disk 11 (S20=L1), the counter 21 counts down the pulse CK during only that period to correct the count output S21.

With the count correcting operation as described above, the exact number of tracks crossed is detected, irrespective of the eccentricity of the disk 11.

The count output S21 thus obtained is supplied as address data to a first ROM 22.

Figure 2A:
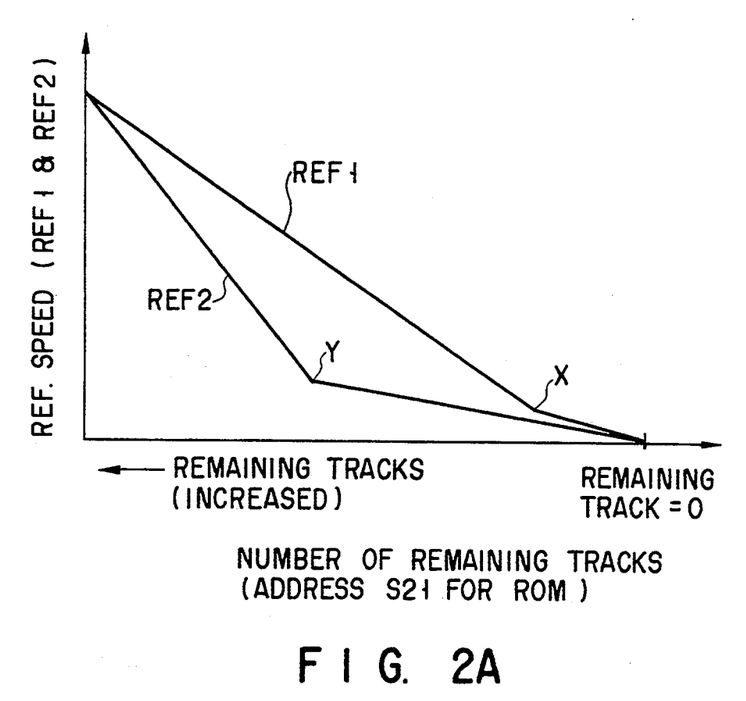
FIG. 2A is a diagram showing the relationship between the change of the reference speed used in controlling the seeking speed of the FIG. 1 optical head and the number of remaining tracks between the head position and the target track on the optical disk.

In the ROM 22 is stored reference speed data REF1 of FIG. 2A, which varies with address data S21, as shown by the curve. Specifically, when the current light spot position is far away from the target track and the number of remaining tracks is large, data REF1 represents a high reference speed. The reference speed of data REF1 decreases as the light spot comes closer to the target track. From a certain point X near the target track, the reducing rate of the reference speed becomes smaller.

Such reference speed data REF1 is selected by the contact 1 of the switch SW30, and the selected data is supplied as a reference value for speed control to a comparator 25.

On the other hand, when the direction of the light spot cannot be sensed as shown in FIGS. 7 and 8, the switch SW20 of FIG. 1 is turned off, the switching of the count modes (between the count-up mode and the countdown mode) at the track counter 21 is prohibited during the seeking operation.

In this case, when the target track is on the − side of the current light spot position (on the internal circumference side of the disk), the + data PD is preset in the counter 21, which counts down the signal SD17.

The output S21 obtained at that time is supplied as address data to a second ROM 23.

In the ROM 23 is stored reference speed data REF2 of FIG. 2A, which varies with address data S21, as shown by the curve. From a certain point Y closer to the target track, the reducing rate of the reference speed becomes smaller. When the direction of the light spot cannot be sensed, after point Y is passed, reference speed REF2 is changed so as to make a gentler curve than before.

Reference speed data REF2 with a gentler curve after point Y is selected by the contact 2 of switch SW30, and the selected signal is supplied as a reference value for speed control to the comparator 25.

The digitized sum signal SA19 corrected at the sum signal compensator 19 is also supplied to the speed detector 24 via the switch SW19. The circuit 24, when receiving the corrected sum signal SA19, detects the moving speed of the light spot from the period of the signal SA19, and when not receiving the signal SA 19, senses the moving speed of the light spot from the period of signal SD17. The detection is performed by counting the period of signal SA19 or signal SD17 in response to clock CKS, and computing the reciprocal of the resulting count.

The moving speed signal S24 of the light spot sensed at the speed detector 24 is supplied as the sensed value of the speed control to the comparator 25.

The comparator circuit 25 supplies the deviation of the sensed value S24 from the reference value REF1 or REF2 to a driving circuit 26. The driving circuit 26 then drives the head carriage assembly 27 according to the deviation S25. In this way, the light spot from the optical head 13 undergoes speed control so as to move at a speed that minimizes the deviation S25.

Specifically, the speed control allows seeking at high reference speeds when there are many tracks left, and at lower reference speeds as the number of remaining tracks decreases. In FIG. 1, components 11 to 21 and 24 to 27 constitute an optical head control unit 100, and components 22 and 23 compose a reference speed table ROM 200.

To summarize what has been explained so far, the apparatus of FIG. 1 operates as follows:

<when the sum signal SA has a sufficient amplitude and the phase difference between sum signal SA19 and difference signal SD17 is approximately 90°>

In this case, switches SW19 and SW20 are both turned on, and switch SW30 selects the first reference speed REF1 from the ROM 22. The speed detector 24 then senses the light spot moving speed by counting the signal period of the output SA19 (or the digitized difference signal SD17) of the sum signal compensator in response to clock CKS.

The comparator 25 compares the sensed speed signal S24 with the first reference speed REF1 selected at switch SW30. Based on the comparison result, the driving circuit 26 drives the head carriage assembly 27 to move the optical head 13 to the target track.

As shown in FIG. 2A, the reference speed REF1 varies with the number of remaining tracks between the current optical head position and the target track. Specifically, the number of remaining tracks is large, REF1 is large, which allows the optical head to undergo high-speed seeking control. As the number of remaining tracks becomes smaller, REF1 becomes smaller, which permits the optical head to undergo low-speed seeking control only in the vicinity of the target track after the head has passed point X.

Figure 3:
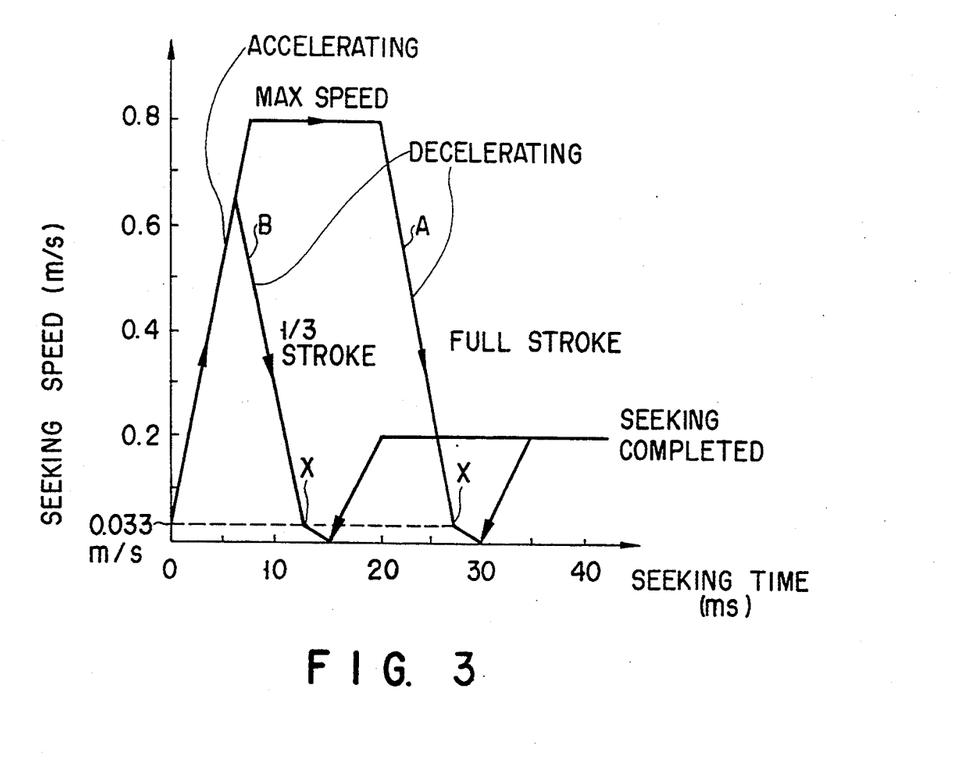
FIG. 3 is a diagram showing the change of the seeking speed with respect to time in the case where the direction of the seeking movement of the light spot from the FIG. 1 optical head is sensed when the light spot accesses the target track on the optical disk.

For a 3.5-inch magnetooptic disk apparatus, the seeking speed actually varies as the reference speed REF1 changes, as shown in FIG. 3, for example.

In FIG. 3, curve A shows the change of speed when seeking is done through a full stroke from the innermost circumference to the outermost circumference (or vice versa). Here, the upward slope toward the right shows the accelerating period of the seeking operation, the horizontal portion represents the maximum speed period of the seeking operation, and the downward slope toward the right indicates the decelerating period of the seeking operation. Inflection point X at the end of the decelerating period is set to a place where the light spot is just in front of the target track. The inflection point X corresponds to point X in FIG. 2A.

In FIG. 3, curve B shows the change of speed when seeking is done through a stroke of one-third the distance from the innermost circumference to the outermost circumference (or vice versa). Here, the upward slope toward the right shows the accelerating period of the seeking operation, and the downward slope toward the right indicates the decelerating period of the seeking operation. In this case, deceleration takes place before the maximum speed is reached.

When the seeking direction can be sensed, the track position of the light spot in motion can be detected accurately with the track counter 21 even if the disk 11 is off-centered. For this reason, when the reference speed REF1 is set at a rather high value, stable speed control can be achieved. Therefore, even in a full stroke seeking, the light spot can be moved to the target track in as short a time as, for example, 30 milliseconds.

<When the amplitude of the sum signal SA is so small that the digitized sum signal SA19 cannot be obtained, or when the sum signal SA19 and difference signal SD17 are in phase or 180° out of phase with one another>

In this case, switches SW19 and SW20 are both turned off, and switch SW30 selects the second reference speed REF2 from the ROM 23. The speed detector 24 senses the light spot moving speed by counting the signal period of the digitized difference signal SD17 in response to clock CKS.

The comparator 25 compares the sensed speed signal S24 with the second reference speed REF2 selected at switch SW30. Based on the comparison result, the driving circuit 26 drives the head carriage assembly 27 to move the optical head 13 to the target track.

Like REF1, the reference speed REF2 varies with the number of remaining tracks between the current optical head position and the target track. Specifically, as shown in FIG. 2A, the number of remaining tracks is large, REF2 is large, whereas the number of remaining racks becomes smaller, REF2 becomes smaller. After the light spot comes closer to the target track and has passed point Y, the optical head is subjected to low-speed seeking control.

Figure 4:
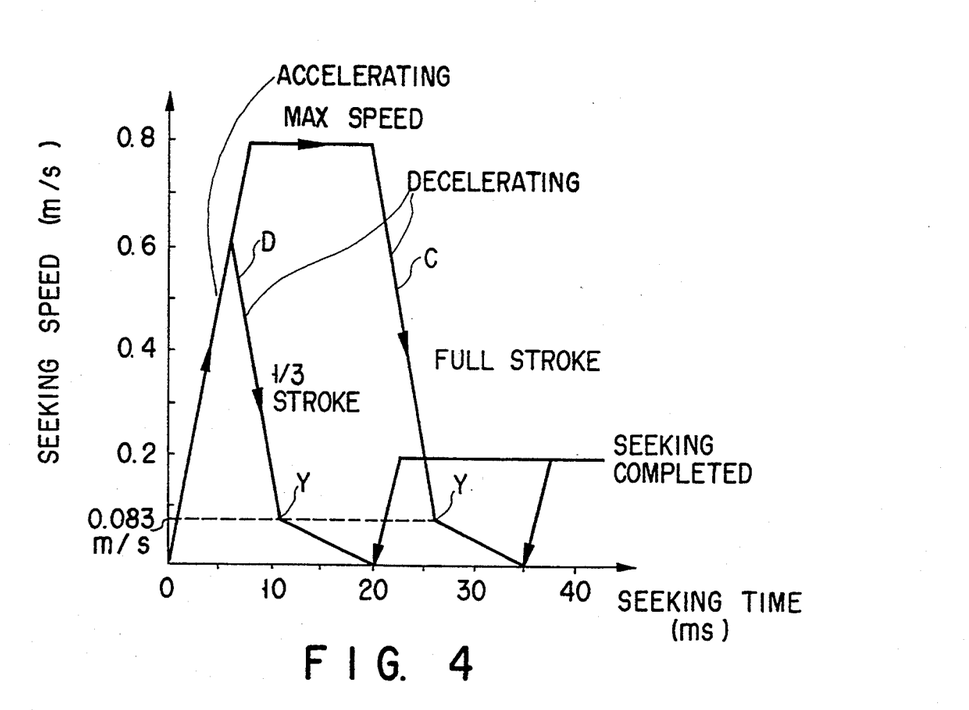
FIG. 4 is a diagram showing the change of the seeking speed with respect to time in the case where the direction of the seeking movement of the light spot from the FIG. 1 optical head is not sensed when the light spot accesses the target track on the optical disk.

For a 3.5-inch magnetooptic disk apparatus, the actual change of the seeking speed corresponding to the change of the reference speed REF2 is shown in FIG. 4, for example.

In FIG. 4, curve C shows the change of speed when seeking is done through a full stroke. Here, the upward slope toward the right shows the accelerating period of the seeking operation, the horizontal portion represents the maximum speed period of the seeking operation, and the downward slope toward the right indicates the decelerating period of the seeking operation. Inflection point Y at the end of the decelerating period is set to a place where the light spot is somewhat closer to the target track. The inflection point Y corresponds to point Y in FIG. 2A.

In FIG. 4, curve D shows the change of speed when seeking is done through a one-third stroke. Here, the upward slope toward the right shows the accelerating period of the seeking operation, and the downward slope toward the right indicates the decelerating period of the seeking operation. In this case, deceleration takes place before the maximum speed is reached.

When the seeking direction cannot be sensed, the track position of the light spot cannot be detected accurately with the track counter 21 if the disk 11 is off-centered. In this case, when the reference speed REF2 near the target track is set at a rather high value, speed control becomes unstable, which sometimes can permit the control system to run out of control.

To avoid this problem, the reference speed REF2 is reduced earlier (from point Y in FIG. 2A) in the FIG. 1 apparatus, so that in a full stroke seeking, it takes, for example, 35 milliseconds for the light spot to reach the target track.

Namely, when the seeking direction cannot be sensed, the stability of the control system is secured by reducing the reference speed earlier than in a normal operation, even if such reduction leads to a longer time before the track is accessed.

Figure 2B:
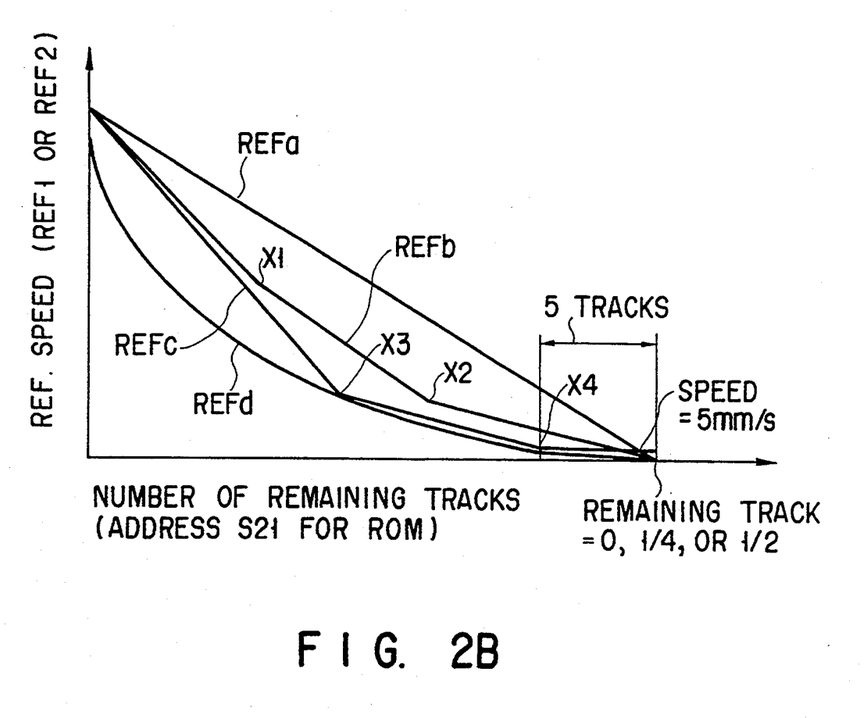
FIG. 2B is a modification of FIG. 2A.

In the embodiment of the present invention, the changing state of reference speeds REF1 and/or REF2 is not limited to that in FIG. 2A. For instance, it may be a single straight line or a polygonal line with three consecutive different slope portions as indicated by REFb. It may also be another polygonal line with three consecutive different slope portions as represented by REFc, or a curve shown by REFd.

Here, while in REFb, the rate of change is not zero throughout the entire portion, in REFd, it is zero (for example, the seeking speed remains at 5 mm/s) in the vicinity of the target track (for example, five tracks ahead of the target one).

The point at which the speed control of the head is ceased may not be where the number of remaining tracks to the target track is zero. For instance, at the time when the head comes a ½ or a ¼ track ahead of the target track, the speed control of the head may be stopped and then replaced with the position control to the target track.

Figure 9:
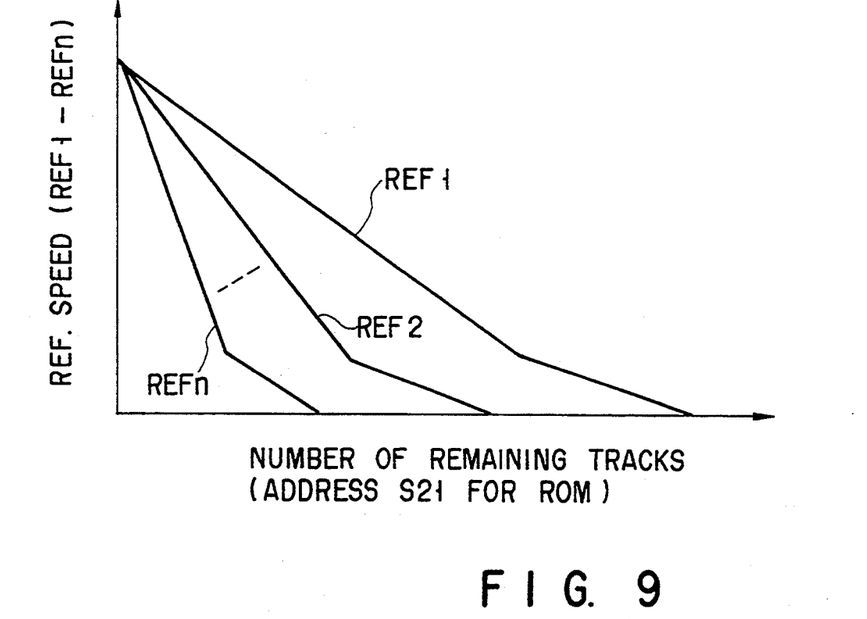
FIG. 9 is a graph showing examples of n types (three or more types) of reference speeds.

Although in the embodiment of FIG. 1, two types of reference speeds are used, more types of reference speeds may be used. FIG. 9 shows the rate of change of each reference speed when n types of reference speeds (three or more types) are used. In this example, reference speed REF1 is the fastest, and reference speed REFn is relatively the slowest.

Figure 10:
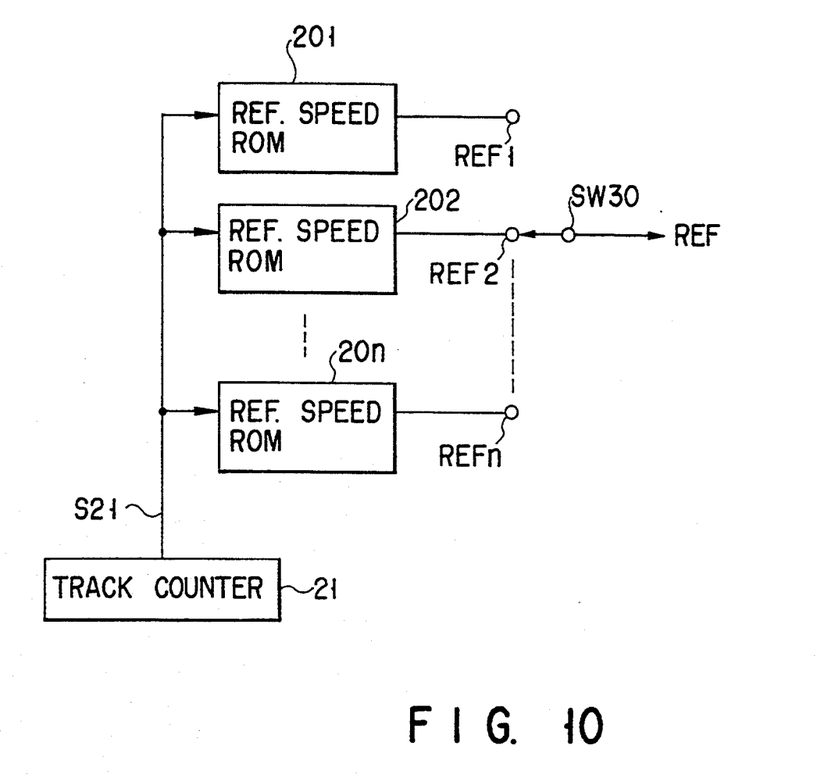
FIG. 10 is a block diagram showing a case where the n types of reference speeds shown in FIG. 9 are stored in n reference-speed ROM tables.

FIG. 10 shows the method of storing the n types of reference speeds shown in FIG. 9 into a reference speed table made up of n ROMs $20_1$ to $20_n$. The read addresses S21 for those n ROM $20_1$ to $20_n$ are obtained from the track counter 21.

Figure 11:
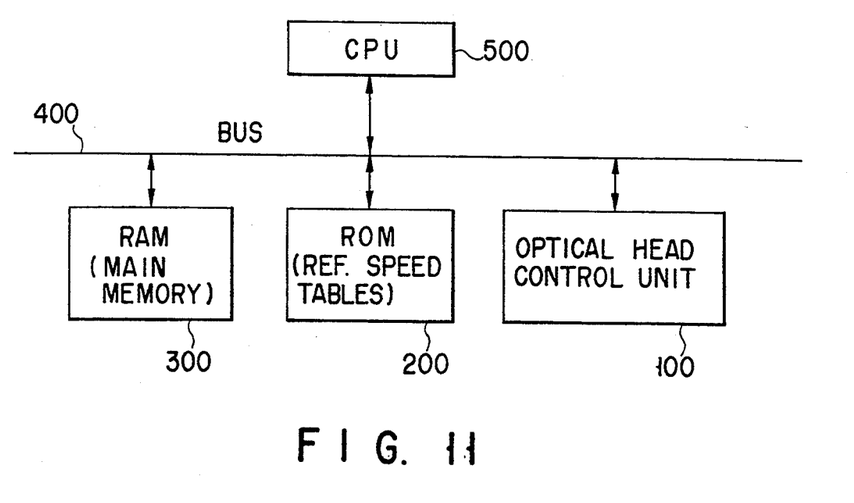
FIG. 11 is a block diagram of a modification where part of the FIG. 1 control apparatus is controlled by the CPU.

FIG. 11 shows a construction that allows the CPU to control part of the FIG. 1 control apparatus. The construction is composed of an ordinary computer system connected with the FIG. 1 optical head control unit 100. Specifically, the CPU 500 is connected via a bus 400 to a main storage RAM 300, a reference speed ROM 200, and the optical head control unit 100.

Figure 12:
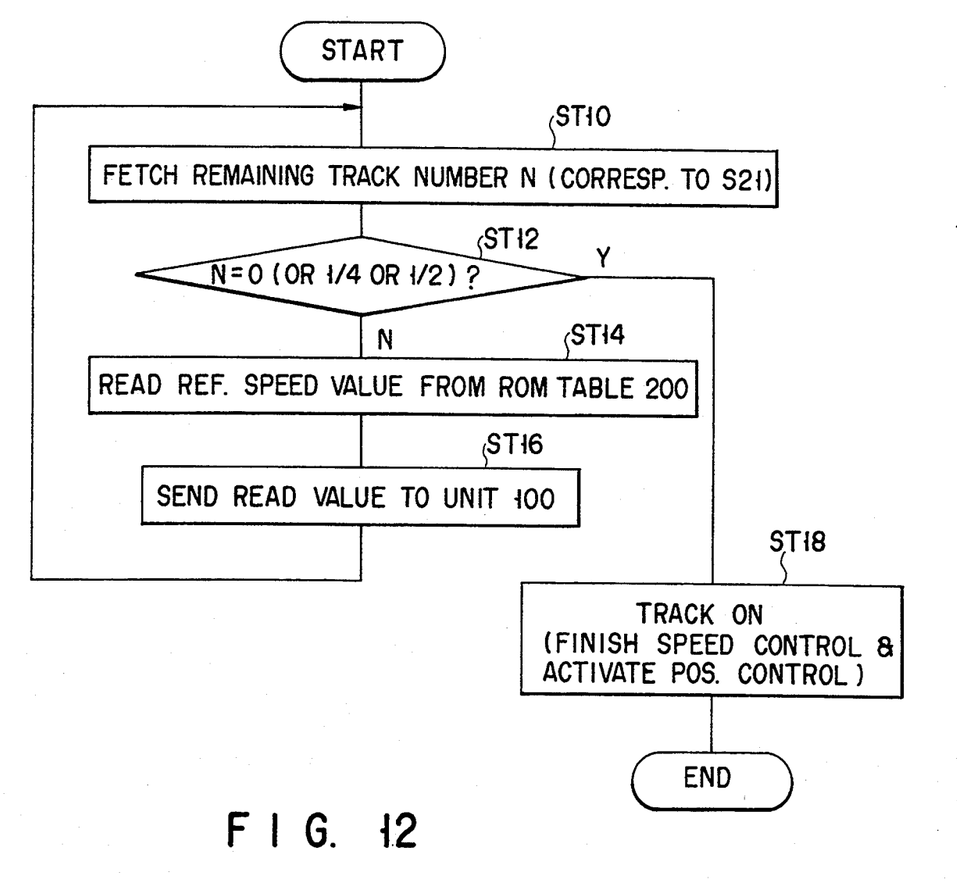
FIG. 12 is a flowchart for explaining how the FIG. 11 CPU controls the head seeking tracks.

FIG. 12 is a flowchart for explaining how the FIG. 11 CPU controls the head seeking tracks. Once the speed control of the optical head 13 is started, first the number N of remaining tracks between the current track position of the head 13 and the target track is taken in by the CPU 500 (ST10). The number N of remaining tracks is loaded as preset data PD into the track counter 21. For this reason, the number N of remaining tracks corresponds to the ROM read address (counter output) S21 at that time.

Then, the number N of remaining tracks taken in is evaluated. When the number N of remaining tracks is zero (that is, when the current position of the head 13 is at the target track), or when N corresponds to a ¼ track or a ½ track (that is, when the head 13 is so close to the target track that the position control enables the position of the head 13 to converge at the target track) (YES at ST12), the track on process is started (ST18). Once this process is started, the speed control as shown in FIGS. 2A and 2B is terminated and the position control of the head 13 is started.

When the number N of remaining tracks is not zero (that is, when the current position of the head 13 is not at the target track), (NO at ST12), the value of reference speed (REF1 or REF2) is read from the ROM 200 according to the address data S21 corresponding to N at that time (ST14). The read-out reference speed value (REF) is sent to the comparator 25 in the control unit 100 (ST16). Undergoing the speed control with the reference speed value (REF), the head 13 moves toward the target track.

While the number N of remaining tracks decreases as the head 13 comes closer to the target track, the processes of steps ST10 to ST16 mentioned above are repeated. Then, when the number N of remaining tracks becomes 0, or comes to correspond to a ¼ track or a ½ track (YES at ST12), the track on process is started (ST18), and the position control of the head 13 is begun.

Figure 13:
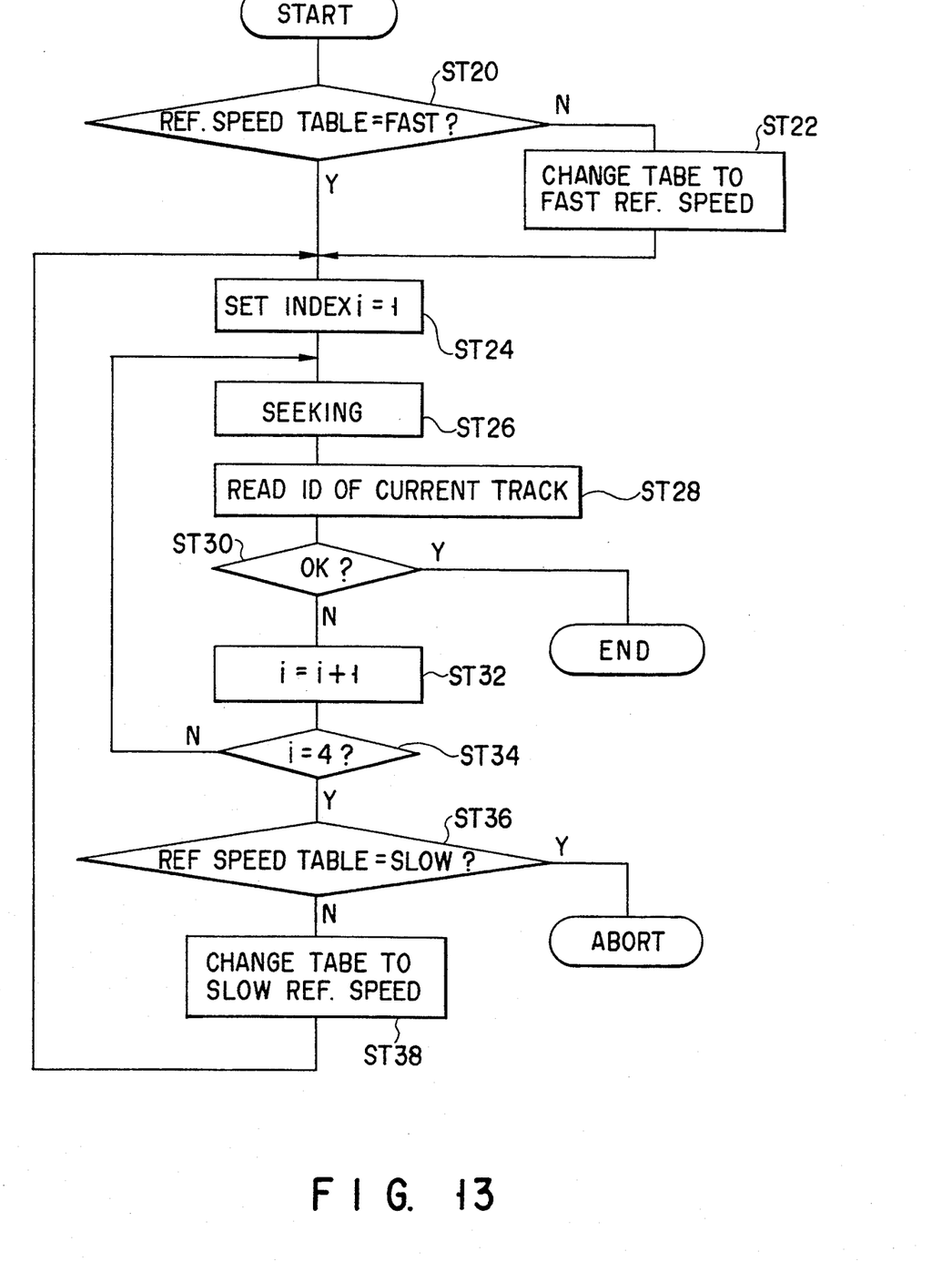
FIG. 13 is a flowchart for explaining the reference-speed switching by the FIG. 11 CPU.

FIG. 13 is a flowchart for explaining the switching of reference speeds by the FIG. 11 CPU. First, check is made to see if the current reference speed table is of the high speed (REF1 in FIG. 2A). If not (NO at ST20), the high reference speed table (REF1) is selected to achieve high-speed seeking. This selection is made by the SW30 of FIG. 1.

Next, after parameter i=1 is set in the index register (not shown) of the CPU 500 (ST24), the head seeking operation is carried out by the speed control explained in FIG. 12 (ST26). As a result of this seeking operation, the head 13 reads the ID number of the track where it is now (ST28). If the read-out track ID number agrees with the ID number of the desired target track (YES at ST30), the seeking of the target track is completed.

If the read-out track ID number disagrees with the ID number of the desired target track (NO at ST30), the index parameter i is incremented by one (ST32). If the incremented parameter value is not four (NO at ST34), the processes of steps ST26 to ST32 will be repeated until those two ID numbers agree with each other at step ST30.

The series of processes is repeated three times at maximum. After they have been repeated three times, this means that index parameter i has been incremented three times at step ST32, which consequently has increased parameter i to four (YES at ST34). This is the case where three attempts to seek the target track have failed.

If the unsuccessful three attempts have been made at the high reference speed (REF1) (NO at ST36), the reference speed is switched to the low reference speed (REF2) by the SW30 of FIG. 1 (ST38). After that, as long as those two ID numbers disagree with one another at step ST30, the processes of steps ST24 to ST38 are repeated.

If another three attempts has failed even when the low reference speed (REF2) was used (YES at ST36), it is judged that the seeking of the target track is impossible, and the processes of FIG. 13 are aborted.

At step ST38, the reference speed may be changed from REF1 of FIG. 2A or REFa of FIG. 2B to REFb, REFc, or REFd of FIG. 2B.

While in the above embodiment, the present invention has been explained using a magnetooptic disk apparatus as an example, it may be applied to CD-ROM reading apparatuses, floppy-disk apparatuses, rim-bubble hard-disk apparatus, and others.

When the head moving direction is sensed by a method other than sensing the phase difference between the sum signal and the difference signal, the track-seeking control of the present invention may be performed on the basis of only one signal (for example, the difference signal SD).

As described so far, in the embodiment of the present invention, the control targets (the reference speeds) of the speed control system are switched between the case where the head-seeking direction can be sensed and the case where it cannot be sensed; and when the seeking direction is known, the track sensing position is corrected according to the eccentricity of the disk, and when the seeking direction is unknown, the control target (the reference speed) is suppressed to such an extent that the control system does not become unstable. This provides a head control apparatus capable of performing not only high-speed head movement control when the head moving direction can be sensed, but also a stable seeking operation without permitting the control system to run out of control even when the head moving direction cannot be sensed.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An apparatus for reproducing information from information recording tracks on a recording medium comprising:
    information reading means for producing a signal that corresponds to said information from said information recording tracks;
    means for moving said information reading means from a current track position to a target track position based on specified data;
    reference speed setting means for setting a plurality of types of reference speeds corresponding to speeds of movement of said information reading means which moves from said current track position to said target track position, said reference speeds being variable according to an interval between said current track position and said target track position;
    means for detecting, based on said signal produced by said information reading means, whether a direction of movement of said information reading means can be detected;
    means for selecting a first one of said reference speeds set by said reference speed setting means when said detecting means detects said direction of movement of said information reading means, and for selecting a second one of said reference speeds set by said reference speed setting means when said detecting means cannot detect said direction of movement of said information reading means; and
    speed control means for determining, based on said selected first or second one of said reference speed, a speed at which said information reading means is to be moved by said moving means.

2. An apparatus according to claim 1, wherein:
    said reference speed setting means includes first reference speed table storage means for storing a first reference speed table that specifies a first moving speed, and second reference speed table storage means for storing a second reference speed table that specifies a second moving speed;
    said information reading means includes means for sensing a first signal indicating its movement over said information recording tracks, and a second signal that is out of phase with said first signal;
    said detecting means includes means for detecting a phase difference between said first signal and said second signal; and
    said selecting means selects, when said detected phase difference is neither 0° nor 180°, said first reference speed table stored in said first reference speed table storage means as said first one of said reference speeds.

3. An apparatus according to claim 1, wherein:
    said reference speed setting means includes first reference speed table storage means for storing a first reference speed table that specifies a first moving speed, and second reference speed table storage means for storing a second reference speed table that specifies a second moving speed;
    said information reading means includes means for sensing a first signal indicating its movement over said information recording tracks, and a second signal that is out of phase with said first signal;
    said detecting means includes means for detecting a phase difference between said first signal and said second signal; and
    said selecting means selects, when said detected phase difference is either 0° nor 180°, said second reference speed table stored in said second reference speed table storage means as said second one of said reference speeds.

4. An apparatus according to claim 1, wherein:
    said reference speed setting means includes first reference speed table storage means for storing a first reference speed table that specifies a first moving speed, and second reference speed table storage means for storing a second reference speed table that specifies a second moving speed;
    said information reading means includes means for sensing a first signal indicating its movement over said information recording tracks, and a second signal that is out of phase with said first signal;
    said detecting means includes phase detection means for detecting a phase difference between said first signal and said second signal; and
    said selecting means selects, when said phase difference between said first signal and said second signal cannot be detected by said phase detection means, said second reference speed table stored in said second reference speed table storage means as said second one of said reference speeds.

5. An apparatus according to claim 1, wherein:
    said reference speed setting means includes first reference speed table storage means for storing a first reference speed table that specifies a first moving speed, and second reference speed table storage means for storing a second reference speed table that specifies a second moving speed;
    said information reading means includes means for sensing a first signal indicating its movement over said information recording tracks, and a second signal that is out of phase with said first signal;
    said detecting means includes signal sensing means for sensing said first signal and said second signal; and
    said selecting means selects, when said first signal can be sensed and said second signal cannot be sensed by said signal sensing means, said second reference speed table stored in said second reference speed table storage means as said second one of said reference speeds.

6. An apparatus according to claim 1, wherein:
said reference speed setting means includes first reference speed table storage means for storing a first reference speed table that specifies a first moving speed, and second reference speed table storage means for storing a second reference speed table that specifies a second moving speed;
said information reading means includes means for sensing a first signal indicating its movement over said information recording tracks, and a second signal that is out of phase with said first signal;
said detecting means includes moving direction detecting means for sensing a moving direction of said information reading means based on a phase difference between said first signal and said second signal, so as to provide a result of said sensing of said moving direction; and
said selecting means selects, when said result of said sensing of said moving direction from said moving direction detecting means specifies said moving direction of said information reading means, said first reference speed table stored in said first reference speed table storage means as said first one of said reference speeds.

7. An apparatus according to claim 1, wherein:
said reference speed setting means includes first reference speed table storage means for storing a first reference speed table that specifies a first moving speed, and second reference speed table storage means for storing a second reference speed table that specifies a second moving speed;
said information reading means includes means for sensing a first signal indicating its movement over said information recording tracks, and a second signal that is out of phase with said first signal;
said detecting means includes moving direction detecting means for sensing a moving direction of said information reading means based on a phase difference between said first signal and said second signal, so as to provide a result of said sensing of said moving direction; and
said selecting means selects, when said result of said sensing of said moving direction from said moving direction detecting means does not specify said moving direction of said information reading means, said second reference speed table stored in said second reference speed table storage means as said second one of said reference speeds.

8. An apparatus according to claim 1, wherein said reference speed setting means includes means for applying to each of said reference speeds a reference speed function data defined with a variable number of remaining tracks between the current track position of said information reading means and the target track position.

9. An apparatus according to claim 8, wherein said reference speed function data contains the data that defines a linear function with the number of remaining tracks being a variable.

10. An apparatus according to claim 8, wherein said reference speed function data contains the data that defines a nonlinear function with the number of remaining tracks being a variable.

11. An apparatus according to claim 8, wherein said reference speed function data contains the data which defines a function that has a linear portion of a first rate of change with the number of remaining tracks being a variable and another linear portion of a second rate of change with the number of remaining tracks being a variable.

12. An apparatus according to claim 8, wherein said reference speed function data contains the data which defines a function that has a linear portion of a first rate of change with said number of remaining tracks being a variable and another linear portion of a second rate of change with the number of remaining tracks being a variable, the function containing a portion whose rate of change is zero when the number of remaining tracks is below a specified value.

13. A head movement control apparatus in which a light beam is projected onto an information track of a rotating recording medium having spiral or concentric information tracks, reflection or transmission of said projected light beam is sensed with a plurality of optical sensors on an optical head, said optical sensors being arranged along a direction crossing said information tracks, and a sum signal and a difference signal of sensed signals obtained from said optical sensors are produced, said control apparatus comprising:
means for moving said optical head toward a target information track on said rotating recording medium, so as to cross said information tracks;
means for detecting a relative direction of movement of said optical head in crossing said information tracks based on a phase difference between said sum signal and said difference signal;
means for detecting a relative speed of movement of said optical head in crossing said information tracks based on at least one of said sum signal and said difference signal;
means for, when said relative direction detecting means has detected said direction of movement of said optical head, controlling said moving means based on a speed detected by said relative speed detecting means, so as to move said optical head toward said target information track at a first speed according to a first reference speed; and
means for, when said relative direction detecting means has not detected said direction of movement of said optical head, controlling said moving means based on a speed detected by said relative speed detecting means, so as to move said optical head toward said target information track at a second speed, which is slower than said first speed, according to a second reference speed.

14. An apparatus for reproducing information from a recording medium comprising:
means for reproducing information from said recording medium;
a first reference table including a first reference speed, which defines a first speed of movement of said reproducing means;
a second reference table including a second reference speed, which defines, based upon a distance between a current position on said recording medium and a target position on said recording medium, a second speed of movement of said reproducing means, said second speed of movement of said reproducing means being slower than said first speed of movement of said reproducing means;
means for selecting one of said first and second reference speeds;
means for moving, in accordance with said selected one of said first and second reference speeds, said reproducing means from said current position on said recording medium to said target position on said recording medium;

means for detecting a direction of movement of said reproducing means when said moving means is moving said reproducing means in accordance with said first reference speed;

means for causing said selecting means to select said second reference speed when said detecting means does not detect said direction of movement of said reproducing means.

15. An apparatus for reproducing information from a recording medium comprising:

means for reproducing information from said recording medium;

means for moving said reproducing means from a current position on said recording medium to a target position on said recording medium;

first detecting means for detecting, from said information reproduced by said reproducing means, a direction of movement of said reproducing means;

second detecting means for detecting whether said first detecting means can detect said direction of movement of said reproducing means;

a first reference table including a first reference speed, which defines a first speed of movement of said reproducing means;

a second reference table including a second reference speed, which defines, based upon a distance between a current position on said recording medium and a target position on said recording medium, a second speed of movement of said reproducing means, said second speed of movement of said reproducing means being slower than said first speed of movement of said reproducing means;

means for selecting one of said first and second reference speeds;

switch means for causing said selecting means to select said first reference speed when said second detecting means detects that said first detecting means can detect said direction of movement of said reproducing means, and for causing said selecting means to select said second reference speed when said second detecting means detects that said first detecting means cannot detect said direction of movement of said reproducing means;

means for controlling said moving means in accordance with said selected one of said first or second reference speeds.

* * * * *